United States Patent
Kanagarathinam et al.

(10) Patent No.: US 11,558,342 B2
(45) Date of Patent: Jan. 17, 2023

(54) METHOD AND DEVICE FOR PERFORMING ASYNCHRONOUS OPERATIONS IN A COMMUNICATION SYSTEM

(71) Applicant: Samsung Electronics Co., Ltd., Suwon-si (KR)

(72) Inventors: Madhan Raj Kanagarathinam, Bangalore (IN); Siva Sabareesh Dronamraju, Bangalore (IN); Sandeep Irlanki, Bangalore (IN); Jamsheed Manja Ppallan, Bangalore (IN); Karthikeyan Arunachalam, Bangalore (IN); Shiva Souhith Gantha, Bangalore (IN); Sunny, Bangalore (IN); Sweta Jaiswal, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 103 days.

(21) Appl. No.: 17/035,537

(22) Filed: Sep. 28, 2020

(65) Prior Publication Data

US 2021/0099415 A1    Apr. 1, 2021

(30) Foreign Application Priority Data

Sep. 27, 2019   (IN) .............................. 201941039265
Sep. 21, 2020   (IN) .............................. 201941039265

(51) Int. Cl.
*H04L 61/4511*      (2022.01)
*H04L 69/16*        (2022.01)
(Continued)

(52) U.S. Cl.
CPC .......... *H04L 61/4511* (2022.05); *H04L 69/16* (2013.01); *H04L 2101/659* (2022.05); *H04W 80/045* (2013.01)

(58) Field of Classification Search
CPC . H04L 61/1511; H04L 69/16; H04L 61/6059; H04W 80/045
See application file for complete search history.

(56) References Cited

U.S. PATENT DOCUMENTS

2012/0179801 A1* 7/2012 Luna ................... H04L 61/1511
                                                      709/223
2014/0215179 A1* 7/2014 Matsuhira ........... G06F 12/0813
                                                       711/211
(Continued)

FOREIGN PATENT DOCUMENTS

WO         2018/186718 A1    10/2018

OTHER PUBLICATIONS

"3rd Generation Partnership Project: Technical Specification Group Services and System Aspects; IP Multimedia Subsystem (IMS); Stage 2 (Release 16)", 3GPP TS 23.228 V16.2.0 (Sep. 2019), 348 pages.

(Continued)

*Primary Examiner* — Chris Parry
*Assistant Examiner* — Steven C Nguyen

(57) ABSTRACT

Embodiments herein include a method for concurrently performing asynchronous operations over IPv4 and IPv6 in a mobile device. The method includes capturing a DNS query-pattern of a plurality of DNS queries for a plurality of services of an application in the mobile device. Further, the method includes performing a DNS lookup in a DNS cache, to obtain a DNS resolution over the IPv4 and the IPv6 based on the DNS query-pattern of the plurality of DNS queries for the plurality of services of the application. Further, the method includes storing the DNS resolution based on the DNS lookup in the DNS cache. Further, the method includes triggering a TCP connection using a pre-connected connection descriptor based on a domain name resolution. Further, (Continued)

the method includes storing the pre-connected connection descriptor corresponding to the TCP connection in a connection pool cache.

14 Claims, 7 Drawing Sheets

(51) Int. Cl.
*H04W 80/04* (2009.01)
*H04L 101/659* (2022.01)

(56) References Cited

U.S. PATENT DOCUMENTS

| | | |
|---|---|---|
| 2016/0014082 A1 | 1/2016 | Bharali et al. |
| 2016/0036943 A1 | 2/2016 | Kish et al. |
| 2016/0308818 A1* | 10/2016 | Torres .................. H04L 45/741 |
| 2019/0253351 A1* | 8/2019 | Ihlar ...................... G06F 13/00 |
| 2020/0310670 A1* | 10/2020 | Bao ....................... G06F 3/0673 |

OTHER PUBLICATIONS

Ppallan et al., "Flare-DNS Resolver (FDR) for optimizing DNS lookup overhead in mobile devices", 2019 16th IEEE Annual Consumer Communications & Networking Conference (CCNC), Feb. 28, 2019, 7 pages.

International Search Report dated Dec. 23, 2020 in connection with International Patent Application No. PCT/KR2020/013241, 3 pages.

Written Opinion of the International Searching Authority dated Dec. 23, 2020 in connection with International Patent Application No. PCT/KR2020/013241, 4 pages.

\* cited by examiner

METHOD AND DEVICE FOR PERFORMING ASYNCHRONOUS OPERATIONS IN A COMMUNICATION SYSTEM

CROSS REFERENCE TO RELATED APPLICATIONS

This application is based on and claims priority under 35 U.S.C. § 119(a) to Indian Provisional Patent Application No. 201941039265 filed on Sep. 27, 2019, and Indian Complete Patent Application No. 201941039265 filed on Sep. 21, 2020 in the Indian Intellectual Property Office, the disclosures of which are herein incorporated by reference in their entirety.

BACKGROUND

1. Field

The present disclosure relates to a method and next generation (NexGen) connectivity optimizer for enhancement of a mobile device's performance for improved connectivity. More, particularly, this disclosure relates to a method for concurrently performing asynchronous operations over internet protocol version 4 (IPv4) and internet protocol version 6 (IPv6) in a mobile device for improvement in performance and connectivity.

2. Description of Related Art

Fifth generation (5G) wireless networks set a standard to provide very high data rates, ultra-reliable low latency communications (URLLC), and significantly improved quality of service (QoS). 5G wireless networks and beyond will power up billions of connected devices as the 5G wireless networks expands wireless services to edge computing and an internet of things (IoT). An internet protocol suite continues its evolution from internet protocol version 4 (IPv4) addresses to internet protocol version 6 (IPv6) addresses by increasing the adoption rate and prioritizing IPv6. Hence, internet service providers (ISP's) are using the address transition method called a dual-stack to prioritize the IPv6 while supporting the existing IPv4. However, this causes more connectivity overhead in the dual-stack as compared to a single-stack network due to its preference schema towards the IPv6. The dual-stack network increases a domain name system (DNS) resolution and transmission control protocol (TCP) connection time that results in higher page loading time, thereby significantly impacting the user experience.

Thus, it is desired to address the above mentioned shortcomings.

SUMMARY

The principal object of the embodiments herein is to provide a method for concurrently performing asynchronous operations over IPv4 and IPv6 in a mobile device. This results in enhancing a performance of the mobile device for improved connectivity. The proposed method can be used to redesign a DNS resolution and TCP connection phases to reduce the user-perceived latency in a dual-stack network for the mobile devices. The proposed method utilizes the IP network diversity to improve connectivity through concurrency and intelligent caching. This results in reducing connectivity overhead and improves page loading time in the mobile device.

Accordingly, the embodiments herein provide a method for concurrently performing asynchronous operations over IPv4 and IPv6 in a mobile device. The method includes capturing, by the mobile device, a DNS query-pattern of a plurality of DNS queries for a plurality of services of at least one application in the mobile device. Further, the method includes performing, by the mobile device, a DNS lookup, in a DNS cache, to obtain at least one DNS resolution over the IPv4 and the IPv6 based on the DNS query-pattern of the at least one application. Further, the method includes storing, by the mobile device, the at least one DNS resolution based on the DNS lookup in the DNS cache. Further, the method includes triggering, by the mobile device, at least one TCP connection using at least one pre-connected connection descriptor based on at least one domain name resolution. Further, the method includes storing, by the mobile device, the at least one pre-connected connection descriptor corresponding to the at least one TCP connection in a connection pool cache.

In an embodiment, the method further includes receiving, by the mobile device, a DNS resolution query from the at least one application. Further, the method includes retrieving, by the mobile device, the at least one DNS resolution from the DNS cache based on the DNS resolution query from the at least one application. Further, the method includes providing, by the mobile device, the at least one retrieved DNS resolution to the at least one application.

In an embodiment, the method further includes receiving, by the mobile device, a TCP connection request from the at least one application based on at least one DNS resolution. Further, the method includes retrieving, by the mobile device, the at least one pre-connected connection descriptor corresponding to the at least one TCP connection from the connection pool cache based on the at least one DNS resolution. Further, the method includes providing, by the mobile device, the at least one pre-connected connection descriptor corresponding to the at least one TCP connection to the at least one application.

In an embodiment, the DNS lookup over the IPv4 and the IPv6 is performed prior to receiving a DNS resolution query from the at least one application.

In an embodiment, at least one DNS resolution indicates one of only the IPv4 is ready, only the IPV6 is ready, or both the IPV4 and the IPv6 are ready.

In an embodiment, performing, by the mobile device, the DNS lookup over the IPv4 and the IPv6, based on the DNS query-pattern of a plurality of DNS queries for a plurality of services of the at least one application includes creating, by the mobile device, two operation threads each of which is dedicated to the IPv6 and the IPv4 socket management separately, and performing, by the mobile device, the DNS lookup over the IPv4 using a first operation thread of the two operation threads and the DNS lookup over the IPv6 using a second operation thread of the two operation threads based on the DNS query-pattern of the plurality of DNS queries for the plurality of services of the at least one application.

In an embodiment, capturing, by the mobile device, the DNS query-pattern of the plurality of DNS queries for the plurality of services of the at least one application in the mobile device includes continuously monitoring, by the mobile device, all outgoing DNS queries from the at least one application, recognizing, by the mobile device, frequently triggered queries from all the outgoing DNS queries based on a number of DNS queries per domain, and capturing, by the mobile device, the DNS query-pattern of the plurality of DNS queries for the plurality of services of the at least one application based on the frequently triggered queries.

In an embodiment, the pre-connected connection descriptor includes a socket identifier (ID) of the TCP connection, wherein the socket ID is used for connecting the at least one application with a server.

In an embodiment, the DNS cache stores the at least one DNS resolution received from an asynchronous DNS resolution controller, wherein the DNS cache learns a sequences of user action corresponding to the DNS query-pattern.

Accordingly, the embodiments herein provide a mobile device for concurrently performing asynchronous operations over IPv4 and IPv6. The mobile device includes a memory comprising a DNS cache and a connection pool cache. A processor is coupled with the memory. An ahead-of-time controller is configured to capture a DNS query-pattern of a plurality of DNS queries for a plurality of services of at least one application in the mobile device. An asynchronous DNS resolution controller is configured to perform a DNS lookup, in a DNS cache, to obtain at least one DNS resolution over the IPv4 and the IPv6 based on the DNS query-pattern of at least one application and store at least one DNS resolution based on the DNS lookup in the DNS cache. An asynchronous DNS management controller is configured to trigger at least one TCP connection using at least one pre-connected connection descriptor based on at least one domain name resolution, and store at least one pre-connected connection descriptor corresponding to at least one TCP connection in a connection pool cache.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
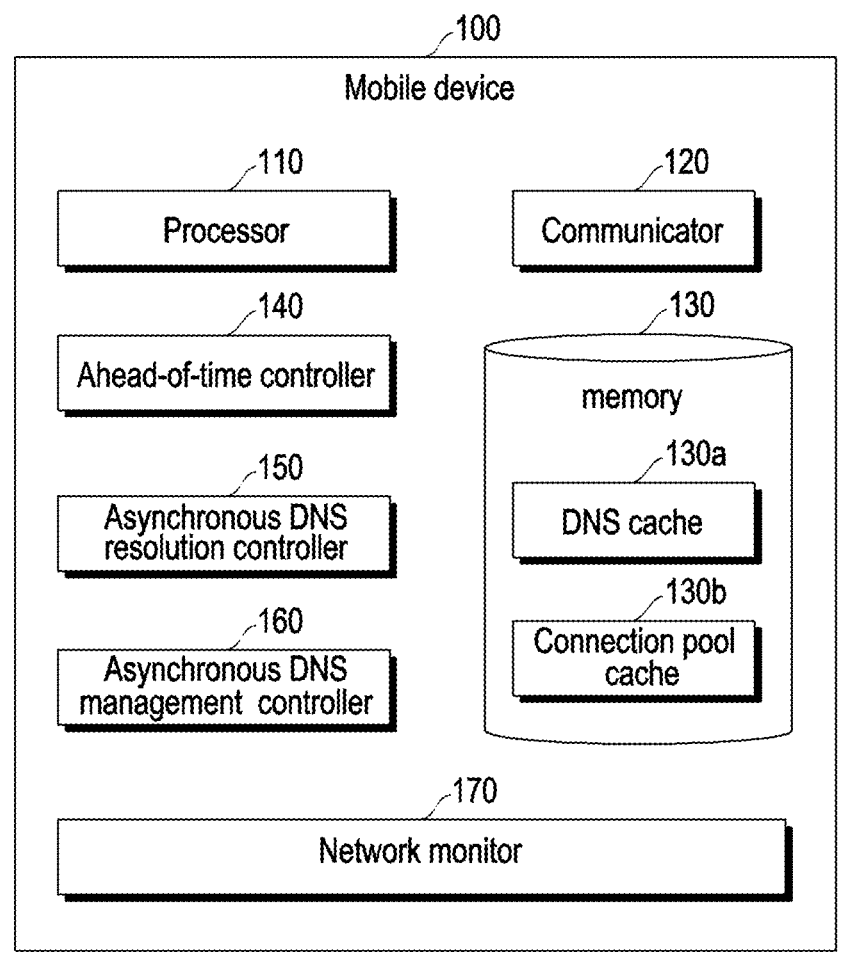
FIG. 1 illustrates various hardware components of a mobile device for concurrently performing asynchronous operations over IPv4 and IPv6, according to the embodiments as disclosed herein.

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure are described with reference to the accompanying drawings. Descriptions of well-known components and processing techniques are omitted so as to not unnecessarily obscure the present disclosure. In addition, various embodiments described herein are not necessarily mutually exclusive, as some embodiments may be combined with one or more other embodiments to form new embodiments. The term "or" as used herein, refers to a "non-exclusive or," unless otherwise indicated. The examples used herein are intended merely to facilitate an understanding of ways in which the present disclosure may be practiced and to further enable those skilled in the art to practice the present disclosure. Accordingly, the examples are not intended to be construed as limiting the scope of the present disclosure.

The present disclosure may be described and illustrated in terms of blocks which carry out a described function or functions. These blocks, which may be referred to herein as "managers," "units," "modules," "hardware components" or the like, may be physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor integrated circuits or chips, or on substrate supports such as printed circuit boards and the like. Circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the present disclosure may be physically separated into two or more interacting and discrete blocks without departing from the scope of the present disclosure. Likewise, blocks of the present disclosure may be physically combined into more complex blocks without departing from the scope of the present disclosure.

The accompanying drawings are intended to facilitate understanding of various technical features but it should be understood that the present disclosure is not intended to be limited by the accompanying drawings. As such, the present disclosure is intended to be construed to extend to any alterations, equivalents and substitutes in addition to those which are particularly set out in the accompanying drawings. Although the terms "first," "second," etc. may be used herein to describe various elements, these elements are not intended to be limited by these terms. These terms are generally only used to distinguish one element from another.

Accordingly, the present disclosure provides a method for concurrently performing asynchronous operations over IPv4 and IPv6 in a mobile device. The method includes capturing, by the mobile device, a DNS query-pattern of a plurality of DNS queries for a plurality of services of at least one application in the mobile device. Further, the method includes performing, by the mobile device, a DNS lookup, in a DNS cache, to obtain at least one DNS resolution over the IPv4 and the IPv6 based on the DNS query-pattern of the at least one application. Further, the method includes storing, by the mobile device, at least one DNS resolution based on the DNS lookup in a DNS cache. Further, the method includes triggering, by the mobile device, at least one TCP connection using at least one pre-connected connection descriptor based on at least one domain name resolution. Further, the method includes storing, by the mobile device, the at least one pre-connected connection descriptor corresponding to the at least one TCP connection in a connection pool cache.

Unlike conventional methods and systems, the proposed method can be used to redesign a DNS resolution and TCP connection phases to reduce the user-perceived latency in a dual-stack network for the mobile devices. The proposed method utilizes the IP network diversity to improve connectivity through a concurrency and intelligent caching. This results in reducing connectivity overhead and improves page loading time in the mobile device.

The method can be used to improve the connectivity of the dual-stack mobile device. Further, the method can be used to support the co-existence of IPv4 and IPv6, while keeping into account the user-perceived latency. The method can be used to support an asynchronous DNS resolution and an application-specific DNS cache on an Android platform. The method can be used to estimate a best TCP connection at any moment and maps it to the application in a simple and efficient manner. The method can be used for concurrently performing asynchronous operations over IPv4 and IPv6 in a mobile device without relying on any user inputs and specific to any application or protocol. The method provides a platform-independent solution.

The proposed method is a user-space solution and does not require any changes in a kernel, existing network protocols, middle boxes or servers. The method can be used to find a best TCP communication path among IPv4 and IPv6 servers with zero connectivity overhead to the application.

In the proposed method, the operation flow in a NexGenCO includes the asynchronous DNS queries Type-A and Type-AAAA, sorting of DNS responses based on destination address selection rule, performs asynchronous TCP connections (IPv4 and IPv6) and estimation of best TCP connection (lowest latency), where the A is a DNS address record and a AAAA is DNS IPv6 Address record. The method can be used to avoid the application overheads by implementing ahead-of-time DNS resolution and TCP connection. The method can be used to introduce per-app caching mechanism for storing DNS responses and TCP connection descriptors.

Referring now to the drawings, and more particularly to FIGS. 1 through 6, where similar reference characters denote corresponding features consistently throughout the figures, there are shown preferred embodiments.

FIG. 1 illustrates various hardware components of a mobile device (100) for concurrently performing asynchronous operations over IPv4 and IPv6, according to the embodiments as disclosed herein. The mobile device (100) can be, for example, but not limited to a cellular phone, a smart phone, a Personal Digital Assistant (PDA), a tablet computer, a laptop computer, an Internet of Things (IoT), a virtual reality device, an immersive system and a smart watch. The mobile device (100) includes a processor (100), a communicator (120), a memory (130), an ahead-of-time controller (140), an asynchronous DNS resolution controller (150), an asynchronous DNS management controller (160), and a network monitor (170). The processor (100) is coupled with the communicator (120), the memory (130), the ahead-of-time controller (140), the asynchronous DNS resolution controller (150), the asynchronous DNS management controller (160) and the network monitor (170). The memory (130) includes a DNS cache (130*a*) and a connection pool cache (130*b*).

The ahead-of-time controller (140) is configured to capture a DNS query-pattern of the plurality of DNS queries for the plurality of services of an application in the mobile device (100). In an embodiment, the DNS query-pattern of the application in the mobile device (100) is captured by continuously monitoring all outgoing DNS queries from the application, recognizing frequently triggered queries from all the outgoing DNS queries based on a number of DNS queries per domain, and capturing the DNS query-pattern of the plurality of DNS queries for the plurality of services of the application based on the frequently triggered queries. The application can be, for example, but not limited to a social media application, a finance application, a chat application, a video application, and a media streaming application.

Further, the asynchronous DNS resolution controller (150) is configured to perform a DNS lookup over the IPv4 and the IPv6 based on the DNS query-pattern of the plurality of DNS queries for the plurality of services of the application and store a DNS resolution based on the DNS lookup in the DNS cache (130a). The DNS lookup over the IPv4 and the IPv6 is performed prior to receiving a DNS resolution query from the application. The DNS resolution indicates one of only the IPv4 is ready, only the IPV6 is ready, or both the IPV4 and the IPv6 are ready.

In an embodiment, the DNS lookup over the IPv4 and the IPv6 is performed by creating two operation threads each of which is dedicated to the IPv6 and the IPv4 socket management separately, and performing the DNS lookup over the IPv4 using a first operation thread of the two operation threads and the DNS lookup over the IPv6 using a second operation thread of the two operation threads based on the DNS query-pattern of the plurality of DNS queries for the plurality of services of the application.

Further, asynchronous DNS management controller (160) is configured to trigger a TCP connection based on a domain name resolution and store a pre-connected connection descriptor corresponding to the TCP connection in the connection pool cache (130b).

Further, the asynchronous DNS resolution controller (150) is configured to receive a DNS resolution query from the application and retrieve the DNS resolution from the DNS cache (130a) based on the DNS resolution query from the application. After retrieving the DNS resolution from the DNS cache (130a), the asynchronous DNS resolution controller (150) is configured to provide the retrieved DNS resolution to the application.

Further, the asynchronous DNS management controller (160) is configured to receive a TCP connection request from the application based on the DNS resolution. Based on the DNS resolution, the asynchronous DNS management controller (160) is configured to retrieve the pre-connected connection descriptor corresponding to the TCP connection from the connection pool cache (130b). After retrieving the pre-connected connection descriptor corresponding to the TCP connection from the connection pool cache (130b), the asynchronous DNS management controller (160) is configured to provide the pre-connected connection descriptor corresponding to the TCP connection to the application.

The processor (110) is configured to execute instructions stored in the memory (130) and to perform various processes. Further, the memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In some examples, the memory (130) can be configured to store larger amounts of information than the memory. In certain examples, a non-transitory storage medium may store data that can, over time, change (e.g., in Random Access Memory (RAM) or cache).

Although FIG. 1 shows various hardware components of the mobile device (100), it is to be understood that other embodiments are not limited thereon. In other embodiments, the mobile device (100) may include a greater or lesser or number of components. Further, the labels or names of the components are used only for illustrative purpose and do not limit the scope of this disclosure. One or more components can be combined together to perform the same or substantially similar function to concurrently perform the asynchronous operations over the IPv4 and the IPv6 in the mobile device (100).

Figure 2A:
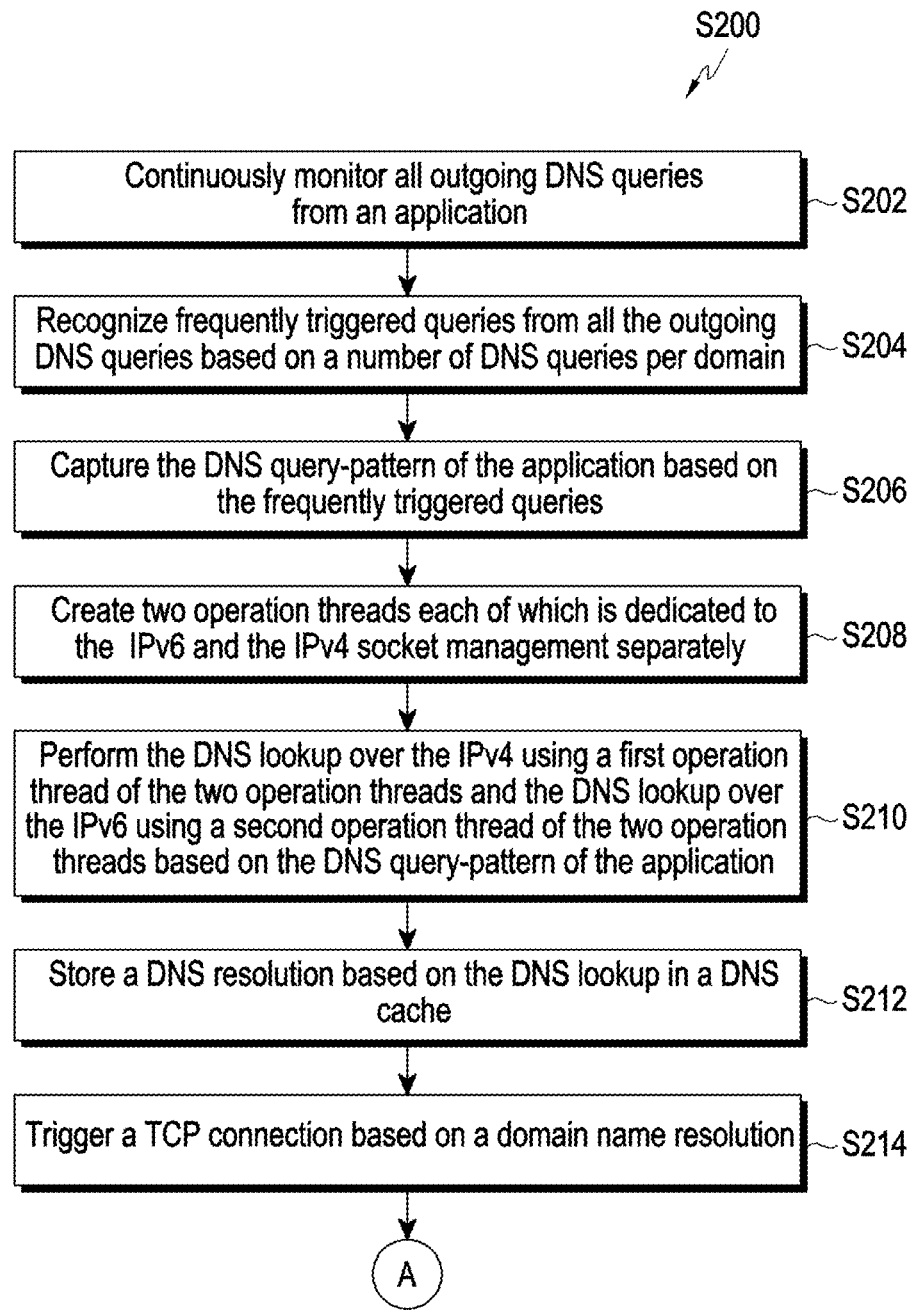
FIGS. 2A and 2B illustrate an exemplary flow chart of a method for concurrently performing asynchronous operations over the IPv4 and the IPv6 in the mobile device, according to the embodiments as disclosed herein.
Figure 2B:
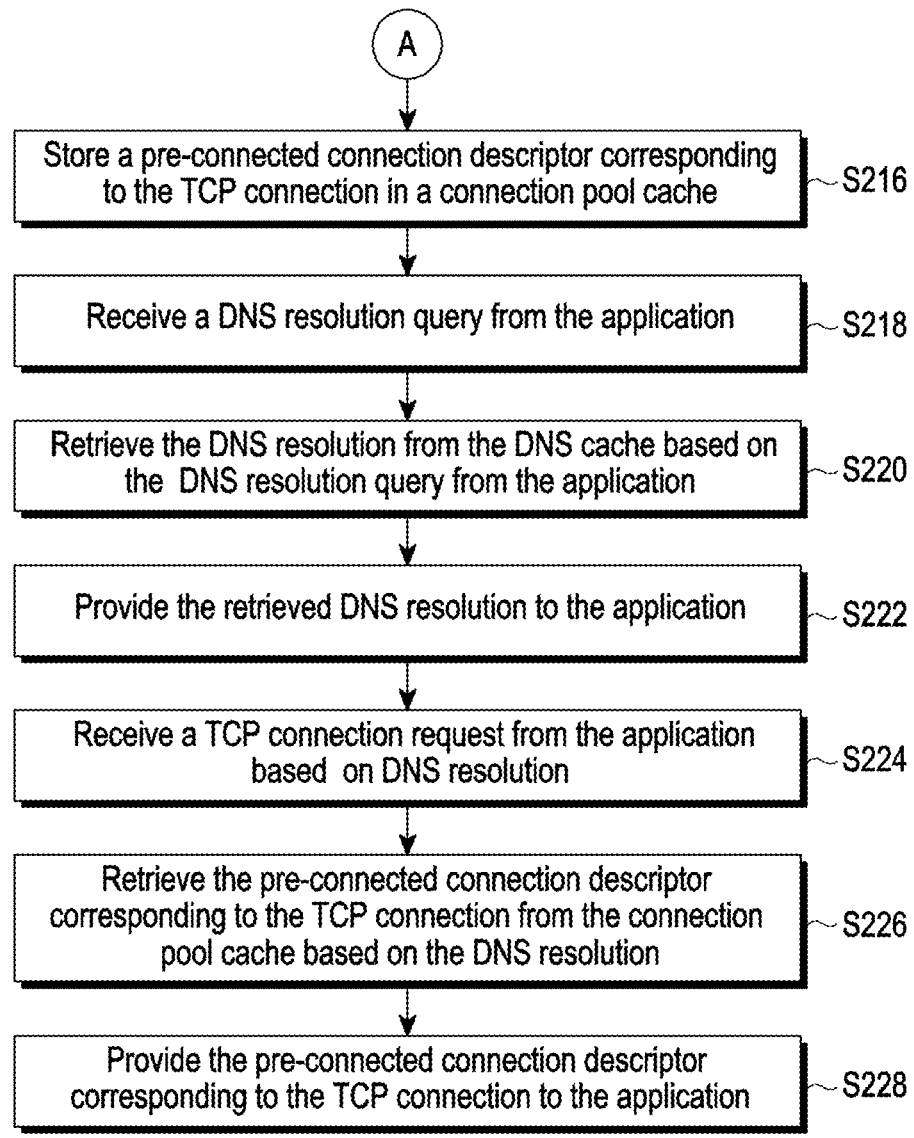

FIGS. 2A and 2B illustrate a flow chart (S200) illustrating a method for concurrently performing asynchronous operations over the IPv4 and the IPv6 in the mobile device (100), according to the embodiments as disclosed herein.

At S202, the method includes continuously monitoring all outgoing DNS queries from the application. In an embodiment, the method allows the ahead-of-time controller (140) to continuously monitor all outgoing DNS queries from the application.

At S204, the method includes recognizing frequently triggered queries from all the outgoing DNS queries based on the number of DNS queries per domain. In an embodiment, the method allows the ahead-of-time controller (140) to recognize the frequently triggered queries from all the outgoing DNS queries based on the number of DNS queries per domain.

At S206, the method includes capturing the DNS query-pattern of the plurality of DNS queries for the plurality of services of the application based on the frequently triggered queries. In an embodiment, the method allows the ahead-of-time controller (140) to capture the DNS query-pattern of the plurality of DNS queries for the plurality of services of the application based on the frequently triggered queries.

At S208, the method includes creating two operation threads each of which is dedicated to the IPv6 and the IPv4 socket management separately. In an embodiment, the method allows asynchronous DNS resolution controller (150) to create two operation threads each of which is dedicated to the IPv6 and the IPv4 socket management separately.

At S210, the method includes performing the DNS lookup over the IPv4 using the first operation thread of the two operation threads and the DNS lookup over the IPv6 using the second operation thread of the two operation threads based on the DNS query-pattern of the plurality of DNS queries for the plurality of services of the application. In an embodiment, the method allows asynchronous DNS resolution controller (150) to perform the DNS lookup over the IPv4 using the first operation thread of the two operation threads and the DNS lookup over the IPv6 using the second operation thread of the two operation threads based on the DNS query-pattern of the plurality of DNS queries for the plurality of services of the application.

At S212, the method includes storing the DNS resolution based on the DNS lookup in the DNS cache (130a). In an embodiment, the method allows asynchronous DNS resolution controller (150) to store the DNS resolution based on the DNS lookup in the DNS cache (130a).

At S214, the method includes triggering the TCP connection based on the domain name resolution. In an embodiment, the method allows the asynchronous DNS management controller (160) to trigger the TCP connection based on the domain name resolution.

At S216, the method includes storing the pre-connected connection descriptor corresponding to the TCP connection in the connection pool cache (130b). In an embodiment, the method allows the asynchronous DNS management controller (160) to store the pre-connected connection descriptor corresponding to the TCP connection in the connection pool cache (130b).

At S218, the method includes receiving the DNS resolution query from the application. In an embodiment, the method allows the asynchronous DNS resolution controller (150) to receive the DNS resolution query from the application.

At S220, the method includes retrieving the DNS resolution from the DNS cache based on the DNS resolution query from the application. In an embodiment, the method allows the asynchronous DNS resolution controller (150) to retrieve the DNS resolution from the DNS cache based on the DNS resolution query from the application.

At S222, the method includes providing the retrieved DNS resolution to the application. In an embodiment, the method allows the asynchronous DNS resolution controller (150) to provide the retrieved DNS resolution to the application. At S224, the method includes receiving the TCP connection request from the application based on the DNS resolution. In an embodiment, the method allows the asynchronous DNS management controller (160) to receive the TCP connection request from the application based on the DNS resolution.

At S226, the method includes retrieving the pre-connected connection descriptor corresponding to the TCP connection from the connection pool cache based on the DNS resolution. In an embodiment, the method allows the asynchronous DNS management controller (160) to retrieve the pre-connected connection descriptor corresponding to the TCP connection from the connection pool cache based on the DNS resolution.

At S228, the method includes providing the pre-connected connection descriptor corresponding to the TCP connection to the application. In an embodiment, the method allows the asynchronous DNS management controller (160) to provide the pre-connected connection descriptor corresponding to the TCP connection to the application.

The proposed method can be used to redesign a DNS resolution and TCP connection phases to reduce the user-perceived latency in a dual-stack network for the mobile devices. The proposed method utilizes the IP network diversity to improve connectivity through a concurrency and intelligent caching. This results in reducing connectivity overhead and improves page loading time in the mobile device (100).

The various actions, acts, blocks, steps, or the like in the flow diagram (S200) may be performed in the order presented, in a different order or simultaneously. Further, in some embodiments, some of the actions, acts, blocks, steps, or the like may be omitted, added, modified, skipped, or the like without departing from the scope of the invention.

Figure 3:
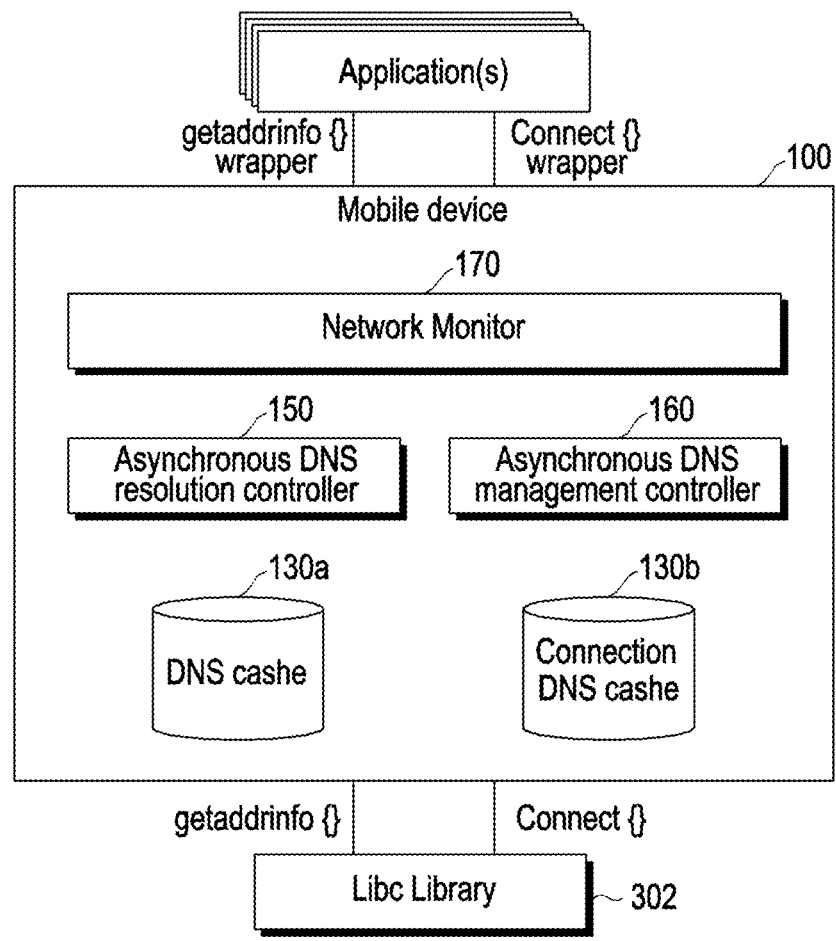
FIG. 3 illustrates an example illustration in which a client shim layer lies between a libc library and an application layer is depicted, according to the embodiments as disclosed herein.

FIG. 3 illustrates an example illustration in which a client shim layer (i.e., NexGenCO) lies between a libc library (302) and an application layer is depicted, according to the embodiments as disclosed herein. The application layer provides wrapper functions for getaddrinfo and connect libc functions. The operations and functions of the ahead-of-time controller (140), the asynchronous DNS resolution controller (150), the asynchronous DNS management controller (160), the DNS cache (130a) and the connection pool cache (130b) are already explained in connection with FIG. 1 and FIGS. 2A-2B.

The DNS cache (130a) and the connection pool cache (130b) store, respectively, the history of the resolved domain names and the history of the connected hosts. The asynchronous DNS resolution controller (150) is responsible for DNS pre-fetching, based on the network stack capabilities. Further, the asynchronous DNS resolution controller (150) performs asynchronous DNS resolution and provides cached DNS responses in the DNS cache (130a) to the applications. Further, the asynchronous DNS resolution controller (150) has access to the DNS cache (130a) for storing the pre-fetched app-specific DNS responses. The asynchronous DNS management controller (160) is responsible to establish TCP connections and determine the best TCP connection between them at any moment. The asynchronous DNS management controller (160) has access to the connection pool cache (130b) for maintaining the pre-connected connection descriptors. Also, the asynchronous DNS management controller (160) has access to the DNS cache (130a) to fetch IP addresses for establishing connections. Further, the network monitor (170) monitors the network conditions, e.g., analyzes the DNS responses and server capabilities, to optimize the operations of the asynchronous DNS management controller (160) and the asynchronous DNS resolution controller (150).

Figure 4:
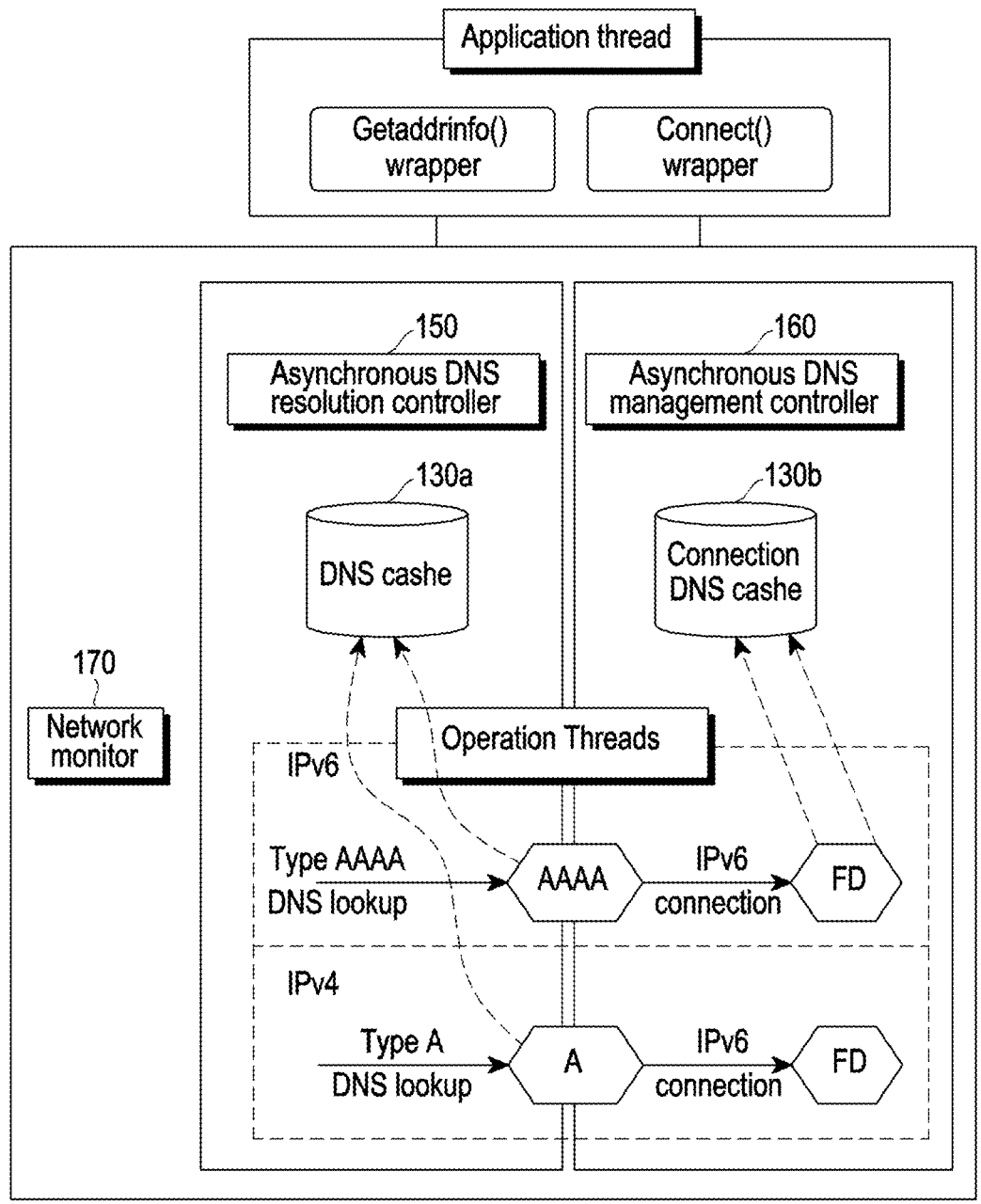
FIG. 4 illustrates an example illustration of overall operations of Next generation connectivity optimizer (NexGenCO) in the mobile device to perform asynchronous operations, according to the embodiments as disclosed herein.

FIG. 4 illustrates an example implementation of the overall operations of NexGenCO to perform asynchronous operations, according to the embodiments as disclosed herein. The NexGenCO creates two operation threads dedicated to IPv6 and IPv4 socket management separately. The asynchronous DNS management controller (160) and the asynchronous DNS resolution controller (150) manage the operation threads for asynchronous DNS resolution and TCP connect respectively. The NexGenCO is capable of capturing the app-specific query-pattern, i.e., frequently resolved domain names. The asynchronous DNS resolution controller (150) is able to trigger the DNS resolution on both operation threads and in performs an asynchronous DNS lookup. Then, each thread separately stores the response in the DNS cache (130a). When the app requests for a resolution in the request, the asynchronous DNS resolution controller (150) replies with the resolution available in the cache or trigger a resolution if not available in cache. Further, the asynchronous DNS resolution controller (150) will notify the application when both IPv4 and IPv6 resolutions are ready. In some case, instead, if NexGenCO has a valid entry in the cache for the requested domain name, the asynchronous DNS resolution controller (150) quickly replies to the application and provides near-zero resolution delay. The method can be used to reduce the DNS traffic generated from the mobile device (100) and reduce the resolution delay.

Further, the asynchronous DNS management controller (160), on each operation thread separately, waits for a domain name resolution. When the asynchronous DNS resolution controller (150) notifies a resolved domain name, the asynchronous DNS management controller (160) will trigger TCP connections on the corresponding the operation thread. Then, each thread stores the connections descriptors in the connection pool cache (130b). When the application requests for a TCP connection, the asynchronous DNS management controller (160) replies with the best available connection, or triggers a new connection. In the latter case, NexGenCO provides the descriptor to the application. In the former case, NexGenCO estimates the best available TCP connection, e.g., connection with minimum initial RTT, and it provides the descriptor to the app. Even an in-progress connection, i.e., the thread opens the connection but the ACK from a server is not received yet, can be passed to the application in this case. In both cases, the asynchronous DNS management controller (160) assigns a connection file descriptor and closes the other connection or the other connection attempt. Finally, the network monitor (170) interacts with the asynchronous DNS management controller (160) and the asynchronous DNS resolution controller (150). The network monitor (170) is in charge to avoid resource wastage in the mobile device (100). Hence, the network monitor (170) monitors the connectivity availability and in case of unavailability, e.g., of IPv6 connectivity, suspends the corresponding thread till the connectivity comes back. Also, the network monitor (170) monitors the network condition and in case of persistent failures, e.g., three subsequent failures, it suspends the thread.

Figure 5:
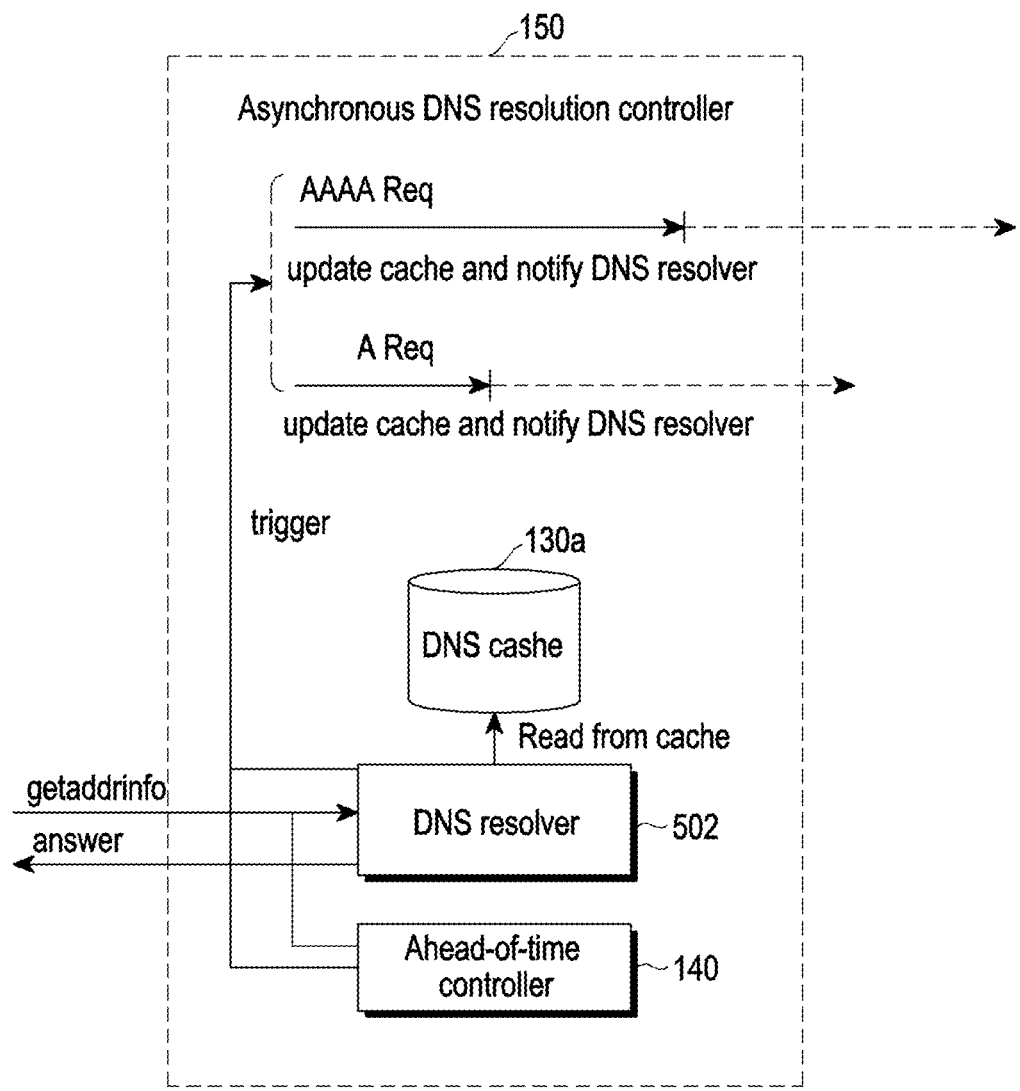
FIG. 5 illustrates inner operations of an asynchronous DNS management controller of the mobile device, according to the embodiments as disclosed herein.

FIG. 5 illustrates inner operations of the asynchronous DNS management controller (160), according to the embodiments as disclosed herein. A main goal of the asynchronous DNS management controller (160) is to reduce the DNS lookup time for an application. In general, a dual-stacked host performs both Type-AAAA (IPv6) and Type-A (IPv4) DNS resolution sequentially, which results in at least two RTT delay for an application, where the A is a DNS address record and a AAAA is DNS IPv6 Address record. The asynchronous DNS management controller (160) reduces the DNS lookup time overhead and overcomes the limitations of the DNS cache (130a). The asynchronous DNS management controller (160) incorporates asynchronous DNS resolution, intelligent DNS caching and ahead-of-time DNS lookup. In an embodiment, the ahead-of-time controller (140) is an important component of asynchronous DNS management controller (160). The ahead-of-time controller (140) triggers DNS resolutions before the application requests for it. Further, the ahead-of-time controller (140) continuously monitors all the outgoing DNS queries and recognizes the frequently triggered queries based on the number of DNS queries per web domain. During the application launch, these frequently triggered DNS queries are used to pre-resolve the domain names before application requests for it. When the application makes DNS request, the asynchronous DNS management controller (160) reads from the cache and immediately replies to the application if a valid resolution is available in cache. If no valid resolutions are available in cache, the asynchronous DNS management controller (160) starts a DNS resolution by triggering DNS queries on different operation threads, which are dedicated for IPv6 and IPv4 socket management, concurrently. Then, each thread updates the DNS responses on the DNS cache (130a) and informs a DNS resolver (502). The asynchronous DNS management controller (160) sorts the resolved IP addresses based on destination address selection rule, e.g., first address provided by the DNS resolution. Then, asynchronous DNS management controller (160) replies to the application and provides the sorted resolved addresses. Thus, the mobile device is able to provide zero RTT DNS responses for an application by performing DNS resolution ahead of time and providing resolution in cache.

Figure 6:
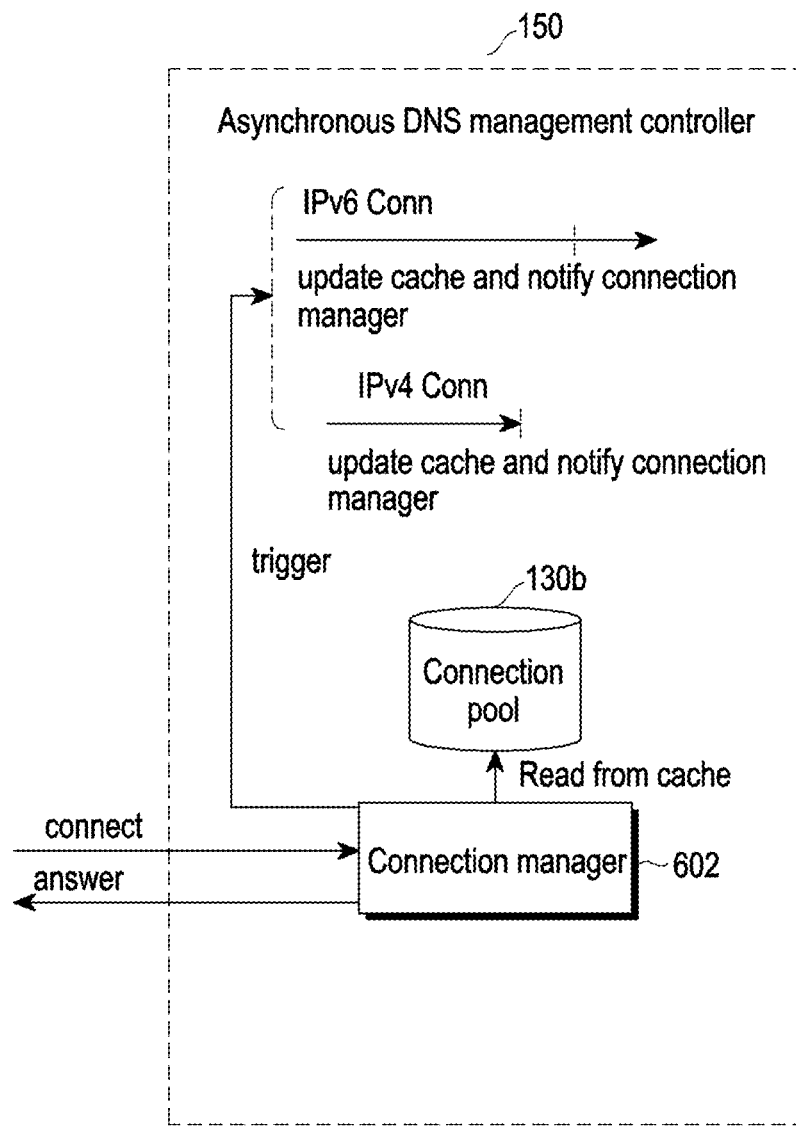
FIG. 6 illustrates inner details of an asynchronous DNS management controller of the mobile device, according to the embodiments as disclosed herein.

FIG. 6 illustrates inner details of the asynchronous DNS management controller (160), according to the embodiments as disclosed herein. The primary objective of the asynchronous DNS management controller (160) is to reduce the TCP connection time for the application. The asynchronous DNS management controller (160) creates one or more parallel connections based on the sorted DNS responses. Whenever the application requests for the connection, the asynchronous DNS management controller (160) estimates the best TCP connection available and maps it to the application descriptor for reducing the socket set-up delay. The main features of the asynchronous DNS management controller (160) are i) concurrent TCP connection attempts and ii) best path estimation. When notified from the asynchronous DNS management controller (160), the asynchronous DNS management controller (160) uses the sorted IP addresses and establishes TCP connections with IPv6 and IPv4 servers separately on each operation thread. As shown in FIG. 6, both connection attempts are made on the dedicated IPv6 and IPv4 operation thread simultaneously. After creating the TCP connections, the asynchronous DNS management controller (160) stores the descriptors in the connection pool. When the application requests for the TCP connection, a connection manager (602) of the asynchronous DNS management controller (160) estimates the best communication path between IPv6 and IPv4 connections. The asynchronous DNS management controller (160) considers the time taken for TCP three-way handshake, connection failure history and IP family of the TCP connection to choose the best connection at the moment. The main aim is to select the connection with minimum initial RTT, no history of connection failures and also matching the app requested IP family.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for performing asynchronous operations over internet protocol version 4 (IPv4) and internet protocol version 6 (IPv6), by a mobile device in a communication system, the method comprising:
    capturing, by the mobile device, a domain name system (DNS) query-pattern of a plurality of DNS queries for a plurality of services of at least one application in the mobile device;
    performing, by the mobile device in a DNS cache, a DNS lookup over the IPv4 using a first operation thread and over the IPv6 using a second operation thread simultaneously, to obtain at least two DNS resolutions over the IPv4 and the IPv6 based on the DNS query-pattern of the plurality of DNS queries for the plurality of services of the at least one application, prior to receiving a DNS resolution query from the at least one application;
    storing, by the mobile device, the at least two DNS resolutions based on the DNS lookup in the DNS cache;
    triggering, by the mobile device, at least two transmission control protocol (TCP) connections for the IPv4 using the first operation thread and for the IPv6 using the second operation thread simultaneously based on at least one domain name resolution, prior to receiving a TCP connection request from the at least one application;
    storing, by the mobile device, pre-connected connection descriptors corresponding to the at least two TCP connections in a connection pool cache;
    receiving, by the mobile device, the DNS resolution query from the at least one application;
    retrieving, by the mobile device from the DNS cache, at least one DNS resolution among the at least two DNS resolutions based on the received DNS resolution query;
    providing, by the mobile device, the at least one retrieved DNS resolution to the at least one application;

receiving, by the mobile device, the TCP connection request from the at least one application based on the at least one retrieved DNS resolution;

retrieving, by the mobile device from the connection pool cache, a pre-connected connection descriptor corresponding to the TCP connection request among the pre-connected connection descriptors; and providing, by the mobile device, the retrieved pre-connected connection descriptor corresponding to the TCP connection request to the at least one application.

2. The method of claim 1, wherein at least one DNS resolution indicates one of only the IPv4 is ready, only the IPV6 is ready, or both the IPV4 and the IPv6 are ready.

3. The method of claim 1, wherein performing the DNS lookup over the IPv4 and the IPv6 based on the DNS query-pattern of the plurality of DNS queries for the plurality of services of the at least one application further comprises:

creating, by the mobile device, the first operation thread and the second operation thread, wherein each of the first operation thread and the second operation thread are separately dedicated to socket management of the IPv6 and the IPv4.

4. The method of claim 1, wherein capturing the DNS query-pattern of the plurality of DNS queries for the plurality of services of the at least one application in the mobile device further comprises:

continuously monitoring, by the mobile device, all outgoing DNS queries from the at least one application;

recognizing, by the mobile device, frequently triggered queries from all the outgoing DNS queries based on a number of DNS queries per domain; and capturing, by the mobile device, the DNS query-pattern of the plurality of DNS queries for the plurality of services of the at least one application based on the frequently triggered queries.

5. The method of claim 1, wherein the at least one pre-connected connection descriptor includes a socket identifier (ID) of the TCP connection, wherein the socket ID is used for connecting the at least one application with a server.

6. The method of claim 1, wherein the DNS cache stores the at least one DNS resolution received from an asynchronous DNS resolution controller, wherein the DNS cache learns a sequences of user action corresponding to the DNS query-pattern.

7. A mobile device for performing asynchronous operations over internet protocol version 4 (IPv4) and internet protocol version 6 (IPv6) in a communication system, comprising:

a memory comprising a DNS cache and a connection pool cache; and a processor, coupled to the memory, wherein the processor is configured to control;

an ahead-of-time controller configured to capture a Domain Name System (DNS) query-pattern of a plurality of DNS queries for a plurality of services of at least one application in the mobile device;

an asynchronous DNS resolution controller configured to perform a DNS lookup over the IPv4 using a first operation thread and over the IPv6 using a second operation thread simultaneously in a DNS cache, to obtain at least two DNS resolutions over the IPv4 and the IPv6 based on the DNS query-pattern of the plurality of DNS queries for the plurality of services of at least one application, prior to receiving a DNS resolution query from the at least one application, store the at least two DNS resolutions based on the DNS lookup in the DNS cache, receive the DNS resolution query from the at least one application, retrieve, from the DNS cache, at least one DNS resolution among the at least two DNS resolutions based on the received DNS resolution query, and provide the at least one retrieved DNS resolution to the at least one application; and an asynchronous DNS management controller configured to trigger at least two TCP connections for the IPv4 using the first operation thread and for the IPv6 using the second operation thread simultaneously based on at least one domain name resolution, prior to receiving a TCP connection request from the at least one application, store pre-connected connection descriptors corresponding to the at least two TCP connections in the connection pool cache, receive the TCP connection request from the at least one application based on the at least one retrieved DNS resolution, retrieve, from the connection pool cache, a pre-connected connection descriptor corresponding to the TCP connection request among the pre-connected connection descriptors, and provide the retrieved pre-connected connection descriptor corresponding to the TCP connection request to the at least one application.

8. The mobile device of claim 7, wherein the at least one DNS resolution indicates one of only the IPv4 is ready, only the IPV6 is ready, or both the IPV4 and the IPv6 are ready.

9. The mobile device of claim 7, wherein perform the DNS lookup over the IPv4 and the IPv6 based on the DNS query-pattern of the plurality of DNS queries for the plurality of services of the at least one application further comprises:

creating the first operation thread and the second operation thread, wherein each of the first operation thread and the second operation thread are separately dedicated to socket management of the IPv6 and the IPv4.

10. The mobile device of claim 7, wherein capture the DNS query-pattern of the plurality of DNS queries for the plurality of services of the at least one application in the mobile device further comprises:

continuously monitoring all outgoing DNS queries from the at least one application;

recognizing frequently triggered queries from all the outgoing DNS queries based on a number of DNS queries per domain; and capturing the DNS query-pattern of the plurality of DNS queries for the plurality of services of the at least one application based on the frequently triggered queries.

11. The mobile device of claim 7, wherein the at least one pre-connected connection descriptor includes a socket identifier (ID) of the TCP connection, wherein the socket ID is used for connecting the at least one application with a server.

12. The mobile device of claim 7, wherein the DNS cache stores the at least one DNS resolution received from the asynchronous DNS resolution controller, wherein the DNS cache learns a sequences of user action.

13. A non-transitory computer readable medium, comprising instructions, that when executed by a processor of a mobile device, cause the mobile device to:

capture a domain name system (DNS) query-pattern of a plurality of DNS queries for a plurality of services of at least one application in the mobile device;

perform a DNS lookup in a DNS cache over the IPv4 using a first operation thread and over the IPv6 using a second operation thread simultaneously, to obtain at least two DNS resolutions over the IPv4 and the IPv6 based on the DNS query-pattern of the plurality of DNS queries for the plurality of services of the at least one application, prior to receiving a DNS resolution query from the at least one application, and store the at least two DNS resolutions based on the DNS lookup in the DNS cache;

trigger at least two transmission control protocol (TCP) connections for the IPv4 using the first operation thread and for the IPv6 using the second operation thread simultaneously based on at least one domain name resolution, prior to receiving a TCP connection request from the at least one application, and store pre-connected connection descriptors corresponding to the at least two TCP connections in a connection pool cache;

receive the DNS resolution query from the at least one application;

retrieve, from the DNS cache, at least one DNS resolution among the at least two DNS resolutions based on the received DNS resolution query;

provide the at least one retrieved DNS resolution to the at least one application;

receive the TCP connection request from the at least one application based on the at least one retrieved DNS resolution;

retrieve, from the connection pool cache, a pre-connected connection descriptor corresponding to the TCP connection request among the pre-connected connection descriptors; and provide the retrieved pre-connected connection descriptor corresponding to the TCP connection request to the at least one application.

14. The non-transitory computer readable medium of claim 13, wherein the at least one DNS resolution indicates one of only the IPv4 is ready, only the IPV6 is ready, or both the IPV4 and the IPv6 are ready.

* * * * *